United States Patent [19]

Hargis

[11] Patent Number: 4,472,060

[45] Date of Patent: Sep. 18, 1984

[54] LOWER GUIDE BEARING ARRANGEMENT FOR TWIN SCREW MIXER

[75] Inventor: Richard A. Hargis, Cincinnati, Ohio

[73] Assignee: Day Mixing Company, Cincinnati, Ohio

[21] Appl. No.: 471,770

[22] Filed: Mar. 3, 1983

[51] Int. Cl.[3] .......................... B01F 7/00; B01F 7/08; B29B 1/06

[52] U.S. Cl. .................................... 366/83; 308/3 R; 308/207 R; 366/100; 366/287; 366/292

[58] Field of Search ...................... 366/66, 100, 83–86, 366/261, 266, 287, 288, 292; 384/129; 308/3 R, 207 R

[56] References Cited

U.S. PATENT DOCUMENTS 3,612,493 10/1971 Nauta ................................ 366/287

*Primary Examiner*—Timothy F. Simone
*Attorney, Agent, or Firm*—Frost & Jacobs

[57] ABSTRACT

A lower guide bearing arrangement for twin screw mixer of the nauta-type wherein the mixing chamber is comprised of an inverted, truncated cone housing a pair of screws supported at their upper ends from the ends of a swing or orbit arm which rotates at a relatively slow speed, the lower ends of the screws being received in guide bearing arrangements mounted on a support member which rotates at the same speed as the orbit arm. Means are provided to drive the screws 15 at a relatively high speed depending on the mixing requirements.

Each lower guide bearing arrangement for the screws of the twin screw mixer is comprised of a shaft mounted on the lower support member, the shaft being received within a bearing housing containing a spherical roller bearing. The housing has a driving engagement with a load ring attached to the lower end of the screw. This driving engagement is achieved by means of a linear sleeve bearing manufactured of a nylon-like material.

The bearing housing, load ring and screw all rotate at the same speed, the load ring being fastened to the screw and the bearing housing being driven via the linear bearing sleeve. This arrangement of spherical roller ring and linear sleeve bearing readily accommodates those deflections of the screw, and manifested at the lower end thereof, occasioned by the forces and heat encountered during mixing; the result is a sort of "universal" guide bearing arrangement for the lower end of the screw as guided by the shaft upstanding from the bottom center support.

4 Claims, 3 Drawing Figures

LOWER GUIDE BEARING ARRANGEMENT FOR TWIN SCREW MIXER

TECHNICAL FIELD

The present invention is pertinent to industrial mixers suitable for mixing and blending a wide range of materials including powders, pastes, creams, doughs, plastisols and other materials, including granules. It is particularly applicable to a Day nauta-type mixer. In general such mixers are comprised of an inverted, truncated cone mixing chamber and assembly including cantilevered arms, with flexible couplings to a drive shaft, which support a pair of screws entirely from the top. The arms rotate at a relatively slow speed about the central axis of the cone while the screws rotate on their own axes at relatively high speeds. To the triple action of the single screw nauta-type mixer—axial, orbital and gravitational—a force is added, namely, intermixing between the two screws.

BACKGROUND ART

A number of patents have issued to one Constant Johan Nauta of Overveen, Netherlands covering both single screw mixers and multiple screw mixers. A search of the United States patent art has not been made with reference to the specific invention herein claimed but it is believed that perhaps U.S. Pat. No. 3,109,633 Nauta is representative of a single screw mixer while U.S. Pat. No. 3,450,390 Nauta may be representative of a multiple screw mixer of the general type to which the present invention may be applied.

In prior arrangements each of the twin screws has been supported from cantilevered arms, the lower bearings carrying no weight and serving only as guides. In such prior arrangements, however, a ball bearing system was incorporated in the lowermost end of each screw and this system was received on an upstanding shaft positioned on a lower support which rotated at the same speed as the cantilevered arms. The ball bearing guide system was drivingly engaged by the screw through metal to metal contact which required a specially treated, hardened surface and also a specially machined surface to permit accommodation of linear deflection as caused by the forces, including heat, encountered during mixing.

The purpose of the instant invention is to improve the lower guide bearing arrangement for the screws of a twin screw mixer so as to eliminate the necessity for special machining and the use of special hard surfaces.

DISCLOSURE OF THE INVENTION

The present invention is directed to a lower guide bearing arrangement for the screws of a twin screw mixer, the arrangement including the use of a linear bearing sleeve which makes it possible to eliminate special machining and special heat treating while at the same time making the guide bearing arrangement less expensive to make and more efficient in operation. The improved arrangement also utilizes spherical roller bearings instead of the ball bearings previously incorporated in guide systems for the lower ends of screws of the type under consideration. The improved guide bearing arrangement of the instant invention also better takes care of the screw deflection occurring particularly at the lower end of the screw as occasioned by the various forces encountered during the mixing operation. This arrangement better accommodates the linear movement occurring at the screw lower end and better accommodates any rocking or wobble action which occurrs. Although such deflections are relatively small, it is quite important that the guide arrangement be able to accommodate them in order for mixing to proceed without interruption.

More specifically, there again is provided an upstanding shaft on a center support which follows the orbital movement of the cantilevered arms. A guide bearing system engages the upper end of that shaft and includes spherical roller bearings. These spherical roller bearings are included within a bearing housing. The lower end of the screw is provided with a load ring which rotates with the screw. A linear sleeve bearing made of a nylon-type material is located between the bearing housing and the load ring. The bearing housing and load ring turn at the same (screw) speed via a friction drive through the linear sleeve bearing.

The lower guide bearing arrangement of this invention, by making possible the use of a linear sleeve bearing of nylon-like material and by permitting the incorporation of spherical roller bearings in place of the ball bearings formerly used, results in an arrangement which better accommodates the various deflections, linear and otherwise, encountered at the lower end of these top supported screws while at the same time resulting in a construction which is less expensive to manufacture.

DETAILED DESCRIPTION OF THE INVENTION

Figure 1:
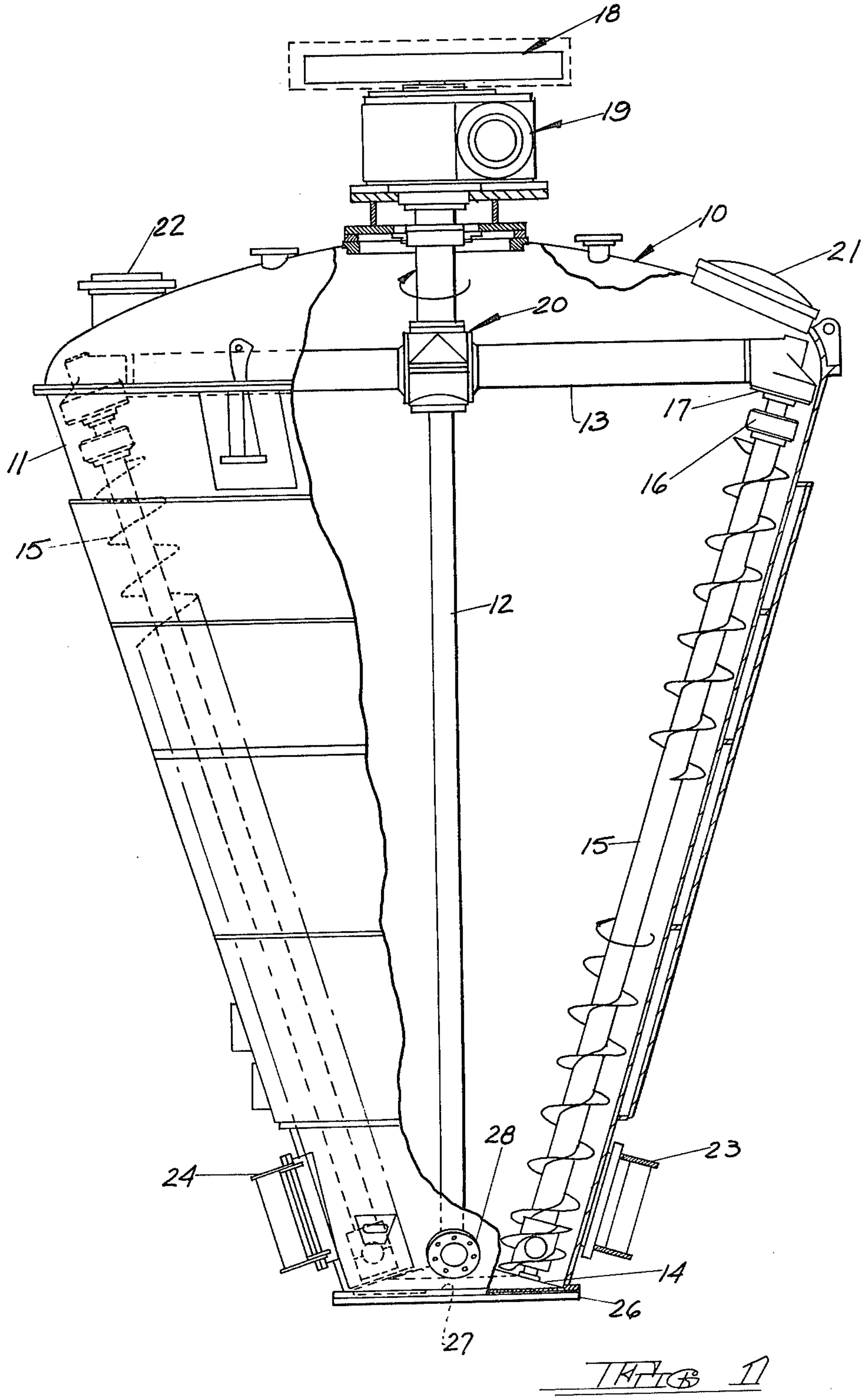
FIG. 1 is an elevation, partly in section and with parts broken away, depicting a twin screw mixer to which the invention has application, certain of the arrangements being shown either diagrammatically or schematically.

The twin screw nauta-type mixer to which the present invention is particularly well suited comprises a cone assembly 10 including an inverted, truncated cone mixing chamber 11 in which there is positioned a center shaft assembly 12, a swing (orbit) arm assembly 13, a bottom center support 14 and a pair of screw flight assemblies 15. Each of the screw flight assemblies 15 is supported from the cantilevered arm assembly 13 by means of flexible couplings 16 and heads 17. A drive assembly 18, gear box assembly 19 and central head 20 are arranged to rotate the arm assembly 13 and bottom center support 14 at a relatively slow speed while simultaneously rotating the screw flight assemblies 15 at relatively high speeds. The mixer may be charged through upper ports 21 and 22 and the mixed material may be discharged or withdrawn through lower ports 23 and 24. All of the foregoing is old and well known in the art and, therefore, has been only briefly described.

The twin screw nauta-type mixer is capable of mixing and blending a wide range of materials both in powder and paste forms. The screw agitators 15, each turning on its axis, produce a lifting action as it spirals the materials in an upward flow in the chamber 11. At the same time these agitators 15 orbit the tank and remove material away from the wall so as to deflect it into the center of the tank, thus setting up a second, wider spiral current throughout the batch. The material so lifted upwardly by the screws then gravitates downwardly, thoroughly intermixing with material simultaneously being spiralled upwardly. In addition the presence of the twin screws 15 insures further intermixing between them. The individual screws 15 may rotate on their own axes at speeds of 30 to 120 rpms while the swing or orbit arm assembly 13 and bottom center support 14 may rotate at speeds on the order of 1 to 4 rpms. The forces encountered during mixing in the manner just described, including also heat, may result in a certain amount of screw deflection, a deflection which may include a bowing action which will result in the lower end of the screw to move upwardly a slight bit. This deflection, however slight though it may be, is an important factor which must be accommodated in order to insure that the mixing proceeds smoothly and without binding or breaking of the equipment.

Figure 2:
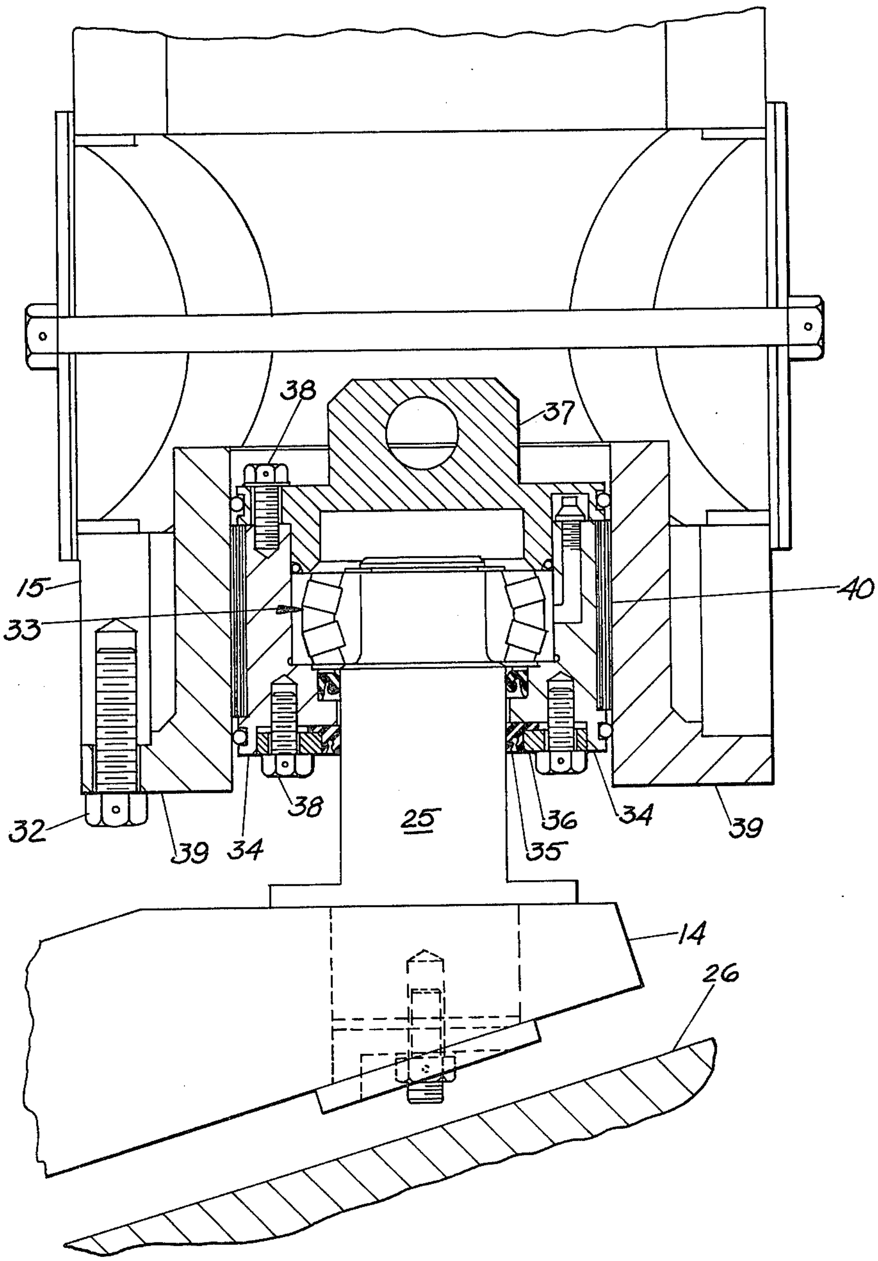
FIG. 2 is an enlarged elevation of the lower end of a screw and the bottom of the mixing chamber, partially fragmented and partically in section.
Figure 3:
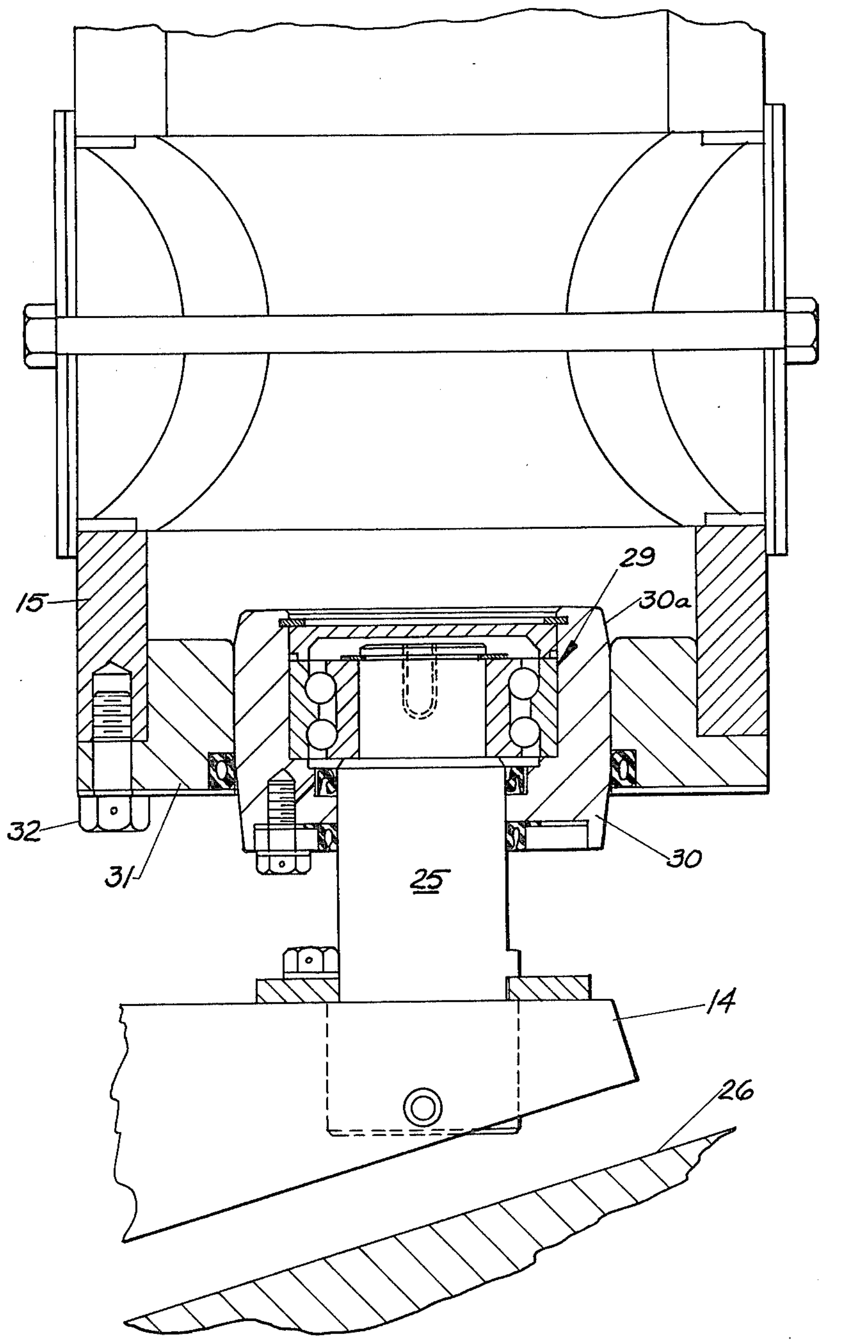
FIG 3 PRIOR ART
FIG. 3,is a view similar to that of FIG. 2 but disclosing a typical prior art arrangement.

FIG. 3 depicts what is believed to be be the prior art lower guide bearing arrangement which is closest to that of the invention, the latter being depicted in FIG. 2. Those elements which are common to the depictions of FIGS. 1, 2 and 3 will be designated by like reference numerals.

Referring first to the prior art depicted in FIG. 3, an upstanding shaft 25 is fixed in the end of the center support arm 14. Those ends of the center support arm 14 which support the upstanding shaft 25 are slightly spaced from the cone bottom 26, it being understood by those skilled in the art that the center portion of the center support 14 is rotatably mounted on the cone bottom 26 as generally indicated at 27 in FIG. 1. This center support 14 has a connection with the shaft 12 as generally indicated at 28 so that the center support 14 rotates at the same, slow speed as does the orbit arm assembly 13. All of the mechanisms so far described are old and well known in the mixing art. In this connection it will be understood by those skilled in this art that the cone assembly 10 and its related mechanisms, driving and otherwise, will be mounted in suitable framework and connected to appropriate sources of power.

The prior art arrangement of FIG. 3 utilizes a ball bearing arrangement generally indicated at 29 and located within a bearing housing 30 in the lower end of screw 15. This lower guide bearing arrangement 29, 30 is located about the top of the upstanding shaft 25 and is drivingly engaged by the bearing ring 31 which is attached to the screw flight assembly 15 as indicated at 32. Suitable seals are provided as indicated and as will be understood by those skilled in the art.

As indicated, the members 30 and 31 have a driving, metal-to-metal contact with one another and both rotate together at the same speed as the screw flight assembly 15. This arrangement necessitates that the contacting surfaces of the members 30 and 31 be specially hardened as, for example, by way of a cobalt alloy surface. In addition at least one of the contacting surfaces of the members 30 and 31 will be specially machined in order to provide a slightly curved surface as indicated at 30*a*. These surfaces are so treated and machined for the purpose of accommodating screw deflection, bowing as will be manifested at the lower end of the screw flight assembly 15 wherein there will be some slight linear movement. This arrangement, while generally satisfactory, is expensive to manufacture and has not been so good in operation as is desired.

The present invention, the lower guide bearing arrangement for twin screw mixer as depicted in FIG. 2, more readily and easily accommodates screw deflection while at the same time being less expensive to manufacture and more easily and quickly assembled. In this arrangement a spherical roller bearing arrangement generally indicated at 33 is located within a bearing housing 34, proper seals such as that shown at 35 and retained by the seal retainer 36 being provided. A top cover 37 is also provided and all of this may be held in place by means such as those shown at 38. This spherical roller bearing arrangement 33 more readily accommodates rocking and like deflections occurring in the lower end of the screw flight assembly 15 as the forces generated during mixing are encountered. The ability to utilize a spherical roller bearing arrangement 33 in the lower guide bearing arrangement of this invention is in part at least faciliated by the driving engagement provided between the bearing housing 34 and load ring 39.

The just mentioned driving engagement between the bearing housing 34 and load ring 39 is achieved through a linear sleeve bearing 40 which is preferably made of a nylon-like material such as that available under the brand name Rulon and manufactured by E. I. DuPont de Namours & Co. (Inc.). The use of this linear sleeve bearing 40 eliminates any metal-to-metal contact between the bearing housing 34 and load ring 39 and this in turn eliminates the requirement of special hardening of what would otherwise be the contacting surfaces of these members and it also eliminates the need to machine special configurations on either or both of these surfaces. The sleeve 40 permits slight linear slippage between the parts 34 and 39 while maintaining the driving relationship between the two. These parts 34 and 39 rotate at the same speed as screw flight assembly 15, the part 39 being engaged with the assembly 15 as indicated at 32.

The friction drive through the sleeve bearing 40, coupled with the use of the spherical roller bearing arrangement 33, provides a much more "universal" type of guide bearing than has heretofore been achieved. All manner of deformations and deflections imparted to the screw flight assembly 15 during operation of the twin screw mixer and as will be manifested at the lower end of the screw 15 are readily accommodated by this combination of spherical roller bearing 33 and linear sleeve, drive bearing 40. Metal-to-metal contact and the need for special shaped surfaces have been eliminated along with the heat treating and machining which would otherwise be necessitated; This in turn results in an arrangement which is less expensive to make and more efficient in operation.

It will be understood by those skilled in the art that certain modifications may be made in this invention without departing from the scope thereof and that while this invention has been shown and described in terms of particular arrangements and structures, such arrangements and structures are not to constitute a limitation on the invention except insofar as they are specifically set forth in the subjoined claims.

I claim:

1. A lower guide bearing arrangement for a twin screw mixer of the type which is comprised of an inverted, truncated cone having a pair of mixing screws therein, each screw having its upper end supported in an end of a swing arm located within the top of the cone, said swing arm being rotatable about the axis of the cone, and a bottom center support located at the lower end of the cone and rotatable with the swing arm, said support having an upstanding shaft thereon, and at least one of said screws having its lower end provided with said guide bearing arrangement, there being drive and gear means located adjacent the top of the cone to rotate the swing arm and the bottom center support together at a relatively slow speed and to rotate each of the mixing screws on its respective axis at a relatively high speed, the said arrangement being characterized by: said guide bearing arrangement being comprised of a bearing housing and a bearing member located in said housing so as to be disposed about said upstanding shaft for rotation thereabout, a load ring fixed to the lower end of a said screw so as to be rotatable therewith, said bearing housing being disposed within the confines of said load ring, and linear sleeve bearing means engaged between said load ring and said bearing housing to establish a friction driving arrangement between said load ring and said bearing housing whereby to rotate said bearing housing at screw speed and to permit linear sliding between said load ring and said bearing housing to compensate for deflections imparted to said mixing screw generated during mixing by side load friction.

2. The lower guide bearing arrangement of claim 1 wherein said linear sleeve bearing means is comprised of a nylon-like material.

3. The lower guide bearing arrangement of claim 1 wherein said bearing member is comprised of a spherical roller bearing arrangement to further compensate for deflections imparted to said mixing screw during mixing.

4. The lower guide bearing arrangement of claim 1 wherein said linear sleeve bearing means is comprised of a nylon-like material, and wherein said bearing member is comprised of a spherical roller bearing arrangement whereby said linear sleeve bearing means and said spherical roller bearing arrangement compensate for deflections imparted to said mixing screw by the forces, including heat, encountered during mixing.

* * * * *